May 25, 1937.    H. E. ALTGELT    2,081,346
POWER LIFT AND POWER DRIVEN POTATO DIGGER
Filed March 2, 1936    2 Sheets-Sheet 1
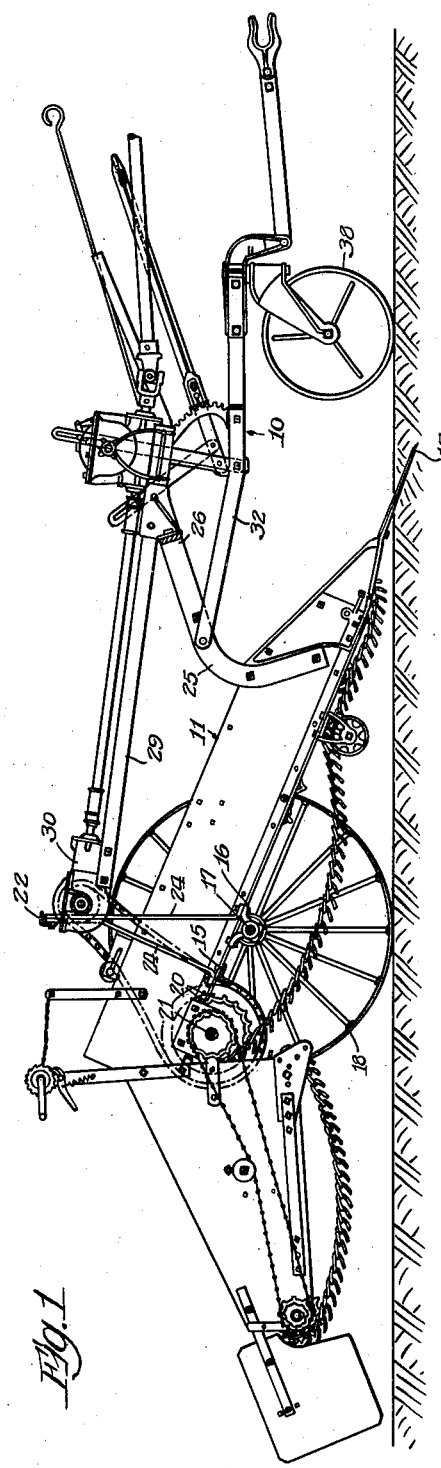
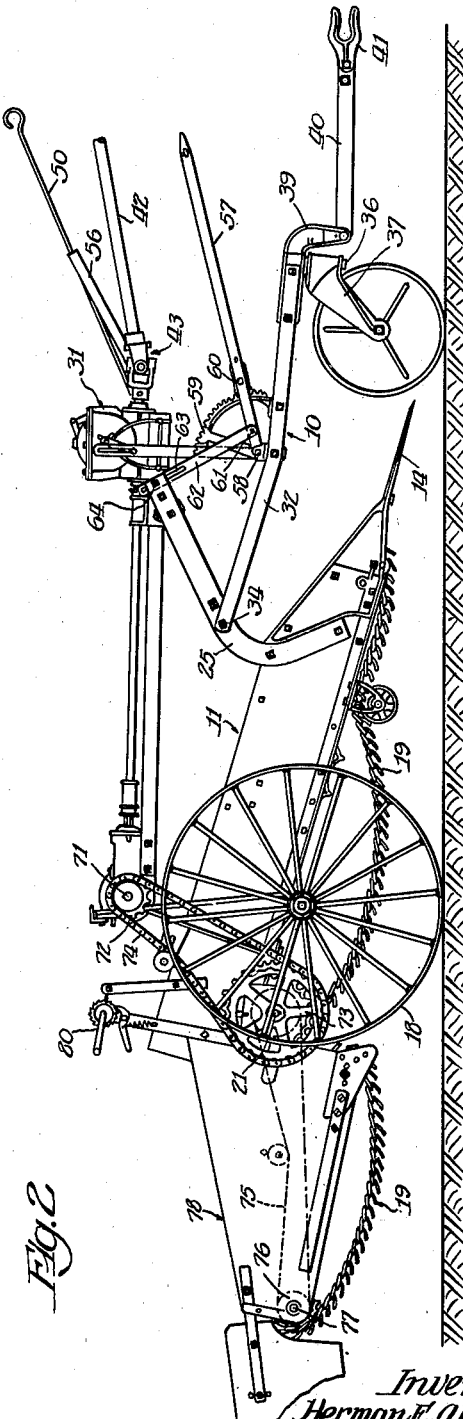
Inventor
Herman E. Altgelt
By John P. Smith Atty.

May 25, 1937.   H. E. ALTGELT   2,081,346
POWER LIFT AND POWER DRIVEN POTATO DIGGER
Filed March 2, 1936   2 Sheets-Sheet 2

Inventor:
Herman E. Altgelt
By John P. Smith Atty.

Patented May 25, 1937

2,081,346

UNITED STATES PATENT OFFICE 2,081,346

POWER LIFT AND POWER DRIVEN POTATO DIGGER

Herman E. Altgelt, South Bend, Ind., assignor to Oliver Farm Equipment Company, a corporation of Delaware Application March 2, 1936, Serial No. 66,572

24 Claims. (Cl. 97—50)

The present invention relates generally to agricultural implements, but more particularly to that type of implement attached to and drawn by the tractor and in which the power take-off shaft of the tractor is not only operatively connected for driving certain movable elements of the implement, but is connected to a power lift mechanism mounted on the implement for raising and lowering certain operative parts of the attached implement and arranged so that the same may be controlled from the operator's seat of the tractor.

Another object of the invention is to provide a novel and improved power drive and power lift mechanism adapted to be mounted on an implement attached to the tractor so that manipulation and control of said mechanism may be accomplished from the operator's seat on the tractor.

A further object of the invention is to provide a novel and improved potato digger of the one or more row type in which a novel transmission and power lift mechanism is mounted thereon and associated with the power take-off shaft of the tractor in combination with a manual adjustment located within easy reach of the operator on the tractor for regulating the depth penetration of the digger blade.

A still further object of the invention is to provide a novel and improved two row potato digger in which two beds thereof are rigidly secured together and adjustably connected to forecarriage in combination with a power transmission and power lift mechanism which is mounted on the digger for operatively driving the moving parts thereof and associated with the forecarriage and frame of the digger for effecting a raising and lowering of the digger frame by power.

These and other objects are accomplished by providing a construction and an arrangement of the various parts in the manner hereinafter described and particularly pointed out in the appended claims.

Referring to the drawings:

Fig. 1 is a side elevational view partly in cross section of my improved potato digger. This view is taken on a line 1—1 in Fig. 3 of the drawings and shows the digger blade in its operative position in engagement with the ground;

Fig. 2 is a similar side elevational view showing the digger blade in its raised position;

Figure 3:
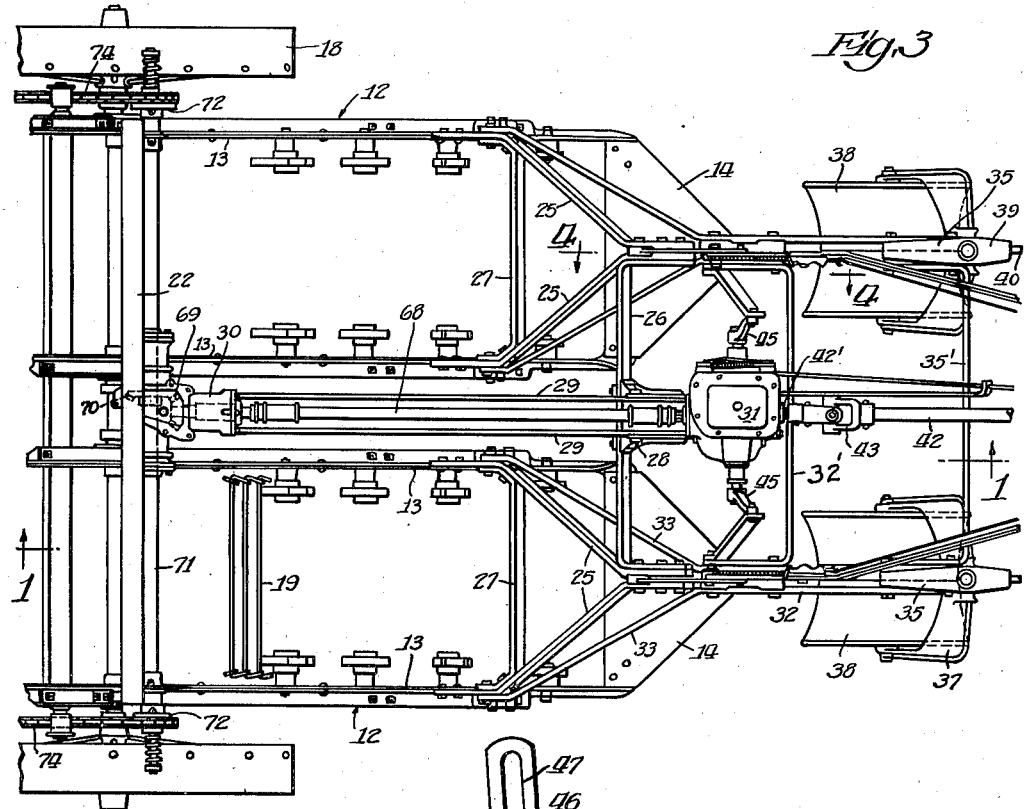
Fig. 3 is a fragmentary top plan vew of the potato digger shown in Figs. 1 and 2 with certain parts omitted for the purpose of clearness.

One form of my invention I have shown in connection with an agricultural implement, preferably of two row potato digger type, but it will of course be understood that the same is adaptable to other types of implements in which a transmission and power lift mechanism is combined as a unit so that the same may be mounted on the implement proper. It will also be noted that while I have illustrated a potato digger of the two row type, the novel features thereof are applicable with equal force to a potato digger of the one row type. In carrying out my invention I have preferably provided a front or forecarriage section, generally indicated by the reference character 10 which is adjustably and pivotally connected to a two row main frame section, generally indicated by the reference character 11. The main frame section comprises two longitudinally extending spaced apart beds indicated by the reference character 12 so as to simultaneously dig two rows of potatoes. Each of these beds comprise vertically extending side walls 13 which have secured at their forward ends pointed digger blades 14. These side wall members 13 are rigidly secured together by a main transverse angle frame member 15. Rigidly secured to the side frame members 13 by means of clamping brackets 16 is a transverse shaft 17. Journaled on the outer ends of the shaft 17 are main supporting wheels 18. Mounted in each of the beds 12 in a manner well understood in the art are the conventional endless conveyor belts or link chains 19 which are trained about the usual sprockets 20 secured to and driven by individual or separate shafts 21. The shafts 21 are journaled in suitable bearings secured to the side frame members 13 of each of the beds. Spaced above and extending across both beds 12 is a supplemental main frame angle member 22 which has its opposite ends rigidly connected to the main frame by means of divergingly extending brace members 24. The forward end of each of the beds is provided with a pair of forwardly converging beams 25. The two pair of beams 25 are rigidly connected together by substantially U-shaped transverse bar 26. The individual pairs of beams 25 are separately reinforced by brace bars 27. Secured to the bar 26 by means of a bracket 28 are two longitudinally extending spaced apart frame bars 29 which have their rear ends secured to a gear housing 30 which in turn has its rear end secured to the transverse supplemental frame member 22. Rigidly secured to the bracket 28 is a transmission and power lift mechanism mounted within a housing, generally indicated by the reference character 31, the details of which will hereinafter be more fully described.

The forecarriage or front frame of the potato digger which controls and regulates the depth penetration of both potato digger blades comprises two pairs of longitudinally extending spaced apart draft frame members 32 located on the opposite sides of the machine. These draft frame members 32 have their rear ends diverging as shown at 33 and are pivoted at their rearmost ends as shown at 34 to the complementary beams 25 of each of the beds. The intermediate portions of these pairs of members 32 are rigidly secured together by a cross bar 32'. Secured to and between the forward ends of these members 32 are wheel brackets 35 in which stub shafts 36 are secured and extend vertically downward therefrom. Journaled on the stub shafts are castor wheel brackets 37 in which are journaled the supporting wheels 38. The two wheel brackets 35 are rigidly secured together by a transverse brace bar 35'. These wheels are of the wide type and are located substantially in the longitudinal center of each of the beds. Formed integrally with the brackets 35 and extending downwardly therefrom are connecting arms 39 to the lower ends of which are pivotally secured forwardly converging draft bars 40. Secured to the forward ends of the converging draft bars 40 is a draft clevis 41 for operatively connecting the potato digger to the draw bar of the tractor.

My improved power transmission and lift mechanism which is adapted to be mounted on an implement or potato digger secures its source of power from the power take-off shaft of the tractor through a shaft 42 which has its forward end connected through the medium of a universal connection to the power take-off shaft of the tractor. The rear end of the shaft 42 is connected by means of a universal connection generally indicated by the reference character 43 which in turn is connected to the forward end of worm shaft 42' of the transmission and power lift mechanism located within the housing 31. This transmission and power lift mechanism is of more or less the conventional construction and consists of a worm and worm wheel having a half revolution clutch associated therewith and is similar to the construction of the power lift mechanism and half revolution clutch illustrated and disclosed in my co-pending application, Serial No. 683,949 filed August 7, 1933. For that reason it is believed a more specific description of this mechanism is not necessary.

Journaled in and located transversely with respect to the housing 31 is an intermittently driven clutch shaft 44 which projects outwardly from the housing on both sides thereof and has rigidly attached to the opposite ends thereof crank arms 45. Secured to the outer end of each of the cranks 45 are stud-bolts 46. Slidingly connected to each of the stud-bolts 46 by means of slots 47 are links 48. The lower ends of the links 48 are pivotally connected as shown at 49 to the inside frame members 32 of the track frame. The half revolution clutch is manually controlled by a rod 50 whose forward end is adapted to extend within easy reach of the operator's seat on the tractor and its rearward end is connected to a bell-crank 51 pivoted at 52 on one side of the housing 31. The upper end of the bell-crank is connected by means of a link 53 to a trip lever 54 which is operatively connected to the clutch mechanism in the manner well understood in the art. The clutch trip 54 is held in its unclutched position by an extension spring 55. The trip rod 50 is held up in position by a guide bar or brace 56 which has its lower end secured to the underside of the housing 31.

In order to regulate the depth penetration of the potato digger blades 14 into the ground, I have provided separately manually adjustable levers 57, the free end of which are within easy reach of the operator's seat on the tractor. These levers are pivotally connected as shown at 58 to a locking quadrant or rack 59 secured to the longitudinally extending carriage frame members 32. Each of these levers are provided with the usual detent locking mechanism 60 for locking the levers in various positions of adjustment. Pivotally connected to these levers adjacent each of their own pivots as shown at 61 are links 62. The upper ends of these links 62 are provided with slots 63 which slidingly engage bolts 64 located between the forward ends of each pair of spaced apart beams 25. The forward ends of these beams 25 are held in spaced apart relation by spacer blocks 66 and are secured together by the two rear bolts 67.

The driven elements of the potato digger which includes the endless shaker chain 19 as well as the dump conveyor chain hereinafter described are driven by an extension shaft 68 which has its forward end connected to a rear extension of the worm shaft 42' mounted in the transmission housing 31. Secured to the rear end of the shaft 68 is a beveled gear 69 which in turn meshes with and drives a second beveled gear 70. This gear 70 is secured to a transverse shaft 71 which extends across both beds and has its opposite ends provided with sprocket wheels 72. The sprocket wheels 72 are geared to and operatively drives complementary sprocket wheels 73 by means of chains 74. The sprocket wheels 73 are secured to the outer ends of their separate or independent drive shafts 21. The inner end of each of these separate shafts 21 are provided with sprockets (not shown) about which are trained endless chains 75. (See Fig. 2.) These chains 75 drive sprocket wheels 76 secured to the inner ends of shafts 17 which, in turn, are mounted in the rear end of the rear conveyors, generally indicated by the reference character 78. Mounted in each of these rear conveyors is the usual endless conveyor belt, generally indicated by the reference character 79 of well known construction. These rear conveyors 78 are pivoted on the shafts 21 and are adjustable with respect to the individual bed by crank mechanism 80 in a manner well understood in the art.

Figure 4:
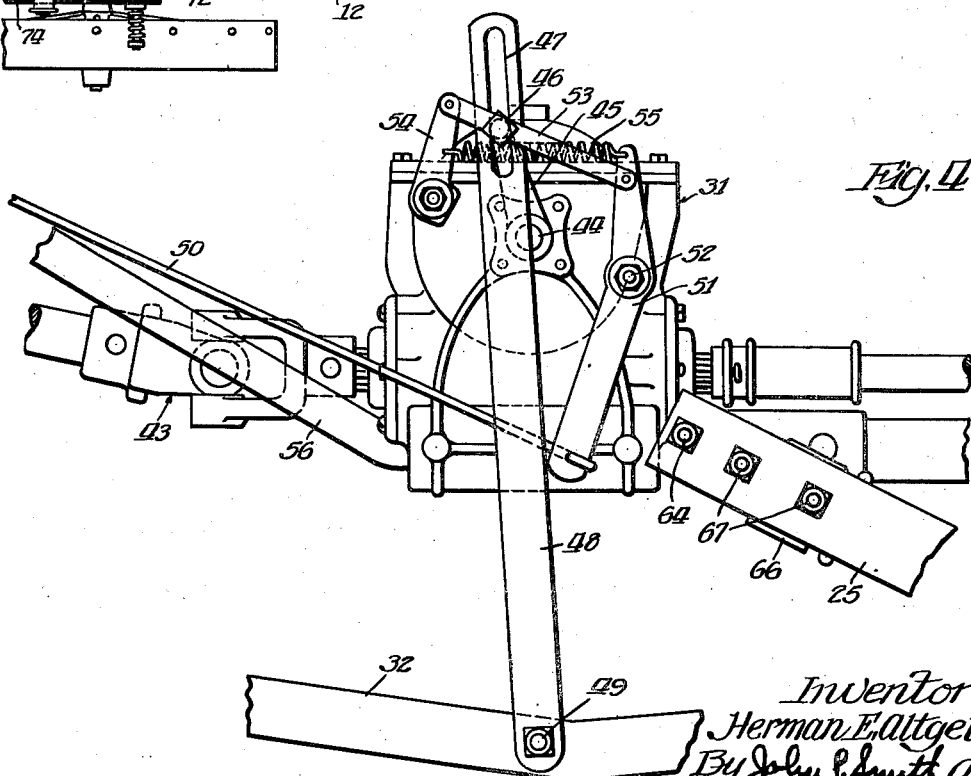
Fig. 4 is an enlarged fragmentary side elevational view taken on the line 4—4 in Fig. 3 showing the transmission and power lift mechanism which is adapted to be mounted on the potato digger frame.

Summarizing the operation of my improved power drive and lift mechanism carried by the implement, let us assume that the potato digger blades 14 are in their operative position in the ground as shown in Fig. 1 of the drawings and that the operator is desirous of raising the blades out of the ground into the inoperative position shown in Fig. 2 of the drawings. Also let us assume that the shaft 42 is being continuously driven from the power take-off shaft of the tractor. Then upon a forward pull of the trip rod 50 by the operator, the trip 54 is actuated to cause the intermittently driven clutch member to engage the continuously driven clutch member in the transmission housing 31, thereby revolving the cranks 45 from their uppermost positions as shown in Figs. 1, 3 and 4 of the drawings to the down or half revolution position as shown in Fig. 2 of the drawings. During this operation the stud bolts 46 of each of the cranks 45 will engage the lower ends of each of the slots 47 in the links 48 so as to raise the forward ends of the beds and consequently the blades 14 out of the ground so as to assume the position shown in Fig. 2 of the drawings. In this connection it will be noted that should the operator desire to regulate or adjust the depth penetration to which the blades 14 may enter the ground, the hand levers 57 may be adjusted and locked in various positions of adjustment by the detent mechanism 60 and quadrant locking racks 59. The adjustment of these levers 57 regulates the position of the slots 63 of the links 62 so as to determine the limit of the position of the forward end of the frame of the digger with respect to the forecarriage 10. In other words, when the lower ends of the slots 63 of the links 62 engages the bolts 64 on the forward end of the beams 25, the blades 14 of the digger can only penetrate the ground to the extent to which the links 62 permit this adjustment.

While in the specification and the drawings I have disclosed a forecarriage for regulating the depth penetration of the blades of the diggers into the ground, it will of course be understood that the wheels of this carriage may be eliminated and the draft frame as a whole supported on and suspended from the draw bar of the tractor so that the digger as a whole may be supported on its rear wheels 18 at the rear end thereof and supported on the forward end thereof by the draw bar of the tractor. When so suspended the power lift mechanism and transmission mechanism as well as the adjustment for depth penetration may at the same time be operable without any changes in the construction disclosed.

While in the above specification I have described one embodiment which my invention may assume in practice, it will of course be understood that the same is capable of modification and that modification may be made without departing from the spirit and scope of the invention as expressed in the following claims:

What I claim as my invention and desire to secure by Letters Patent is:

1. The combination with an agricultural implement having a main frame, of a forecarriage pivotally connected to said frame, movable elements mounted on said frame, a transmission mechanism mounted on said main frame for driving said movable elements, and a power lift mechanism associated with said transmission mechanism and operatively connected to said carriage for adjusting said main frame with respect to said carriage.

2. The combination with an agricultural implement having a main frame, of a supplemental frame pivoted to said main frame, movable elements mounted on said main frame, a power transmission mechanism mounted on said main frame for driving said movable elements, and a power lift mechanism associated with said transmission mechanism and operatively connected with said supplemental frame for adjusting said main frame with respect to said supplemental frame.

3. The combination with an agricultural implement having a rear frame, of a front frame pivoted to said rear frame, movable elements mounted on said rear frame, a power transmission mechanism mounted on said rear frame for driving said movable elements, and a power lift mechanism associated with said transmission mechanism and operatively connected to said front frame for adjusting said rear frame with respect to said front frame.

4. The combination with an agricultural implement having a main frame, of a ground engaging tool carried by said main frame, movable elements mounted on said main frame, a second frame pivoted to said main frame, a power transmission mechanism mounted on said main frame for driving said movable elements, and a power lift mechanism associated with said transmission mechanism and operatively connected to said second named frame for raising and lowering said ground engaging tool with respect to the ground.

5. The combination with an agricultural implement having a main frame, of a ground engaging tool carried by said main frame, movable elements mounted on said main frame, a second frame pivoted to said main frame, a power transmission mechanism mounted on said main frame for driving said movable elements, a power lift mechanism associated with said transmission mechanism and operatively connected to said second named frame for raising and lowering said ground engaging tool with respect to the ground, and manually operable means associated with said power lift mechanism for regulating the depth penetration of said tool into the ground.

6. The combination with an agricultural implement having a main frame, of a ground engaging tool carried by said main frame, movable elements mounted on said main frame, a second frame pivoted to said main frame, a power transmission mechanism mounted on said main frame for driving said movable elements, a power lift mechanism associated with said transmission mechanism and operatively connected to said second named frame for raising and lowering said ground engaging tool with respect to the ground, and manually operable means connected between said main frame and said second named frame for regulating the depth penetration of said tool into the ground.

7. The combination with an agricultural implement having a main frame, of a ground engaging tool carried by said main frame, movable elements mounted on said main frame, a second frame pivoted to said main frame, a power transmission mechanism mounted on said main frame for driving said movable elements, a power lift mechanism associated with said transmission mechanism and operatively connected to said second named frame for raising and lowering said ground engaging tool with respect to the ground, and a slotted link operatively connected between said main frame and said second named frame for limiting the relative movement of one frame with respect to the other.

8. The combination with an agricultural implemen having a main frame, of a ground engaging tool carried by said main frame, movable elements mounted on said main frame, a second frame pivoted to said main frame, a power transmission mechanism mounted on said main frame for driving said movable elements, a power lift mechanism associated with said transmission mechanism and operatively connected to said second named frame for raising and lowering said ground engaging tool with respect to the ground, a slotted link operatively connected between said main frame and said second named frame for limiting the relative movement of one frame with respect to the other frame, and manually adjustable means connected with said link for adjusting said link with respect to said second named frame.

9. A two row potato digger comprising a main frame, two beds rigidly mounted on said main frame, a front frame pivoted to said main frame, digger blades secured to the forward ends of said beds, separated endless elevator belts mounted in each bed, a power transmission mechanism mounted on said main frame for driving said belts, and a power lift mechanism associated with and driven by said transmission mechanism and operatively connected to said front frame for raising and lowering said blades and beds simultaneously.

10. A potato digger for digging a plurality of rows of potatoes comprising a main frame, a plurality of beds rigidly secured to said main frame, endless elevator belts mounted in each of said beds, digger blades mounted on the forward ends of said beds, a power transmission mechanism mounted on said main frame for driving said belts, a forecarriage pivoted to said main frame, and a power lift mechanism comprising two cranks disposed on the opposite sides of and associated with said transmission mechanism, said cranks operatively connected to the opposite sides of said forecarriage for raising and lowering the forward ends of said beds.

11. A potato digger for digging a plurality of rows of potatoes comprising a main frame, a plurality of beds rigidly secured to said main frame, endless elevator belts mounted in each of said beds, digger blades mounted on the forward ends of said beds, a power transmission mechanism mounted on said main frame for driving said belts, a forecarriage pivoted to said main frame, a power lift mechanism comprising two cranks disposed on the opposite sides of and associated with said transmission mechanism, said cranks operatively connected to the opposite sides of said forecarriage for raising and lowering the forward ends of said beds, and manually operable means associated with said power lift mechanism for regulating the depth penetration of said blades into the ground.

12. A potato digger for digging a plurality of rows of potatoes comprising a main frame, a plurality of beds rigidly secured to said main frame, endless elevator belts mounted in each of said beds, digger blades mounted on the forward ends of said beds, a power transmission mechanism mounted on said main frame for driving said belts, a forecarriage pivoted to said main frame, a power lift mechanism comprising two cranks disposed on the opposite sides of and associated with said transmission mechanism, said cranks operatively connected to the opposite sides of said forecarriage for raising and lowering the forward ends of said beds, slotted links operatively connected between said main frame and said forecarriage for limiting the relative movement of one with respect to the other and manually adjustable means connected with said links for adjusting said links with respect to said forecarriage.

13. A potato digger comprising a main frame, an endless elevator belt mounted on said main frame, a power transmission mechanism mounted on said main frame for driving said belt, a digger blade mounted on the forward end of said main frame, a front frame pivoted to said main frame, a power lift mechanism comprising a crank disposed on one side of and intermittently driven by said transmission mechanism, and a slotted link connecting said crank with said front frame for raising and lowering said blade with respect to the ground.

14. A potato digger comprising a main frame, an endless elevator belt mounted on said main frame, a power transmission mechanism mounted on said main frame for driving said belt, a digger blade mounted on the forward end of said main frame, a front frame pivoted to said main frame, a power lift mechanism comprising a crank disposed on one side of and intermittently driven by said transmission mechanism, a slotted link connecting said crank with said front frame for raising and lowering said blade with respect to the ground, and a second slotted link between said main frame and said front frame for limiting the movement of one frame with respect to the other.

15. A potato digger comprising a main frame, an endless elevator belt mounted on said main frame, a power transmission mechanism mounted on said main frame for driving said belt, a digger blade mounted on the forward end of said main frame, a front frame pivoted to said main frame, a power lift mechanism comprising a crank disposed on one side of and intermittently driven by said transmission mechanism, a slotted link connecting said crank with said front frame for raising and lowering said blade with respect to the ground, and manually operable means associated with said power lift mechanism for regulating the depth penetration of said blade into the ground.

16. A potato digger comprising a main frame, an endless elevator belt mounted on said main frame, a power transmission mechanism mounted on said main frame for driving said belt, a digger blade mounted on the forward end of said main frame, a front frame pivoted to said main frame, a power lift mechanism comprising a crank disposed on one side of and intermittently driven by said transmission mechanism, a slotted link connecting said crank with said front frame for raising and lowering said blade with respect to the ground, a second slotted link operatively connected between said main frame and said front frame for limiting the relative movement of one of said frames with respect to the other and manually adjustable means connected to said last named link for adjusting the same with respect to said front frame.

17. A potato digger comprising a main frame, an endless elevator belt mounted on said main frame, a power transmission mechanism mounted on said main frame for driving said belt, a digger blade mounted on the forward end of said main frame, a front frame pivoted to said main frame, a power lift mechanism comprising a crank disposed on one side of and intermittently driven by said transmission mechanism, and a link connecting said crank with said front frame for raising and lowering said blade with respect to the ground.

18. A tractor drawn potato digger comprising a frame, a movable elevator mounted on said frame, a digger blade carried by said frame, a power lift mechanism mounted on said frame for lifting said digger blade, and a power take-off shaft extending from the tractor through said power lift mechanism for operatively driving the same and for driving said elevator.

19. The combination with an agricultural implement having a main frame, a draft frame pivoted to said main frame, substantially continuously driven elements mounted on said main frame, a transmission mechanism mounted on said main frame for driving said continuously driven elements, and intermittently driven means operatively connecting said draft frame with said transmission mechanism for adjusting said main frame with respect to said draft frame.

20. A tractor drawn potato digger comprising a frame, a digger blade mounted in the forward end of said frame, a movable elevator mounted on said frame, a draft frame connecting said main frame to said tractor, a power lift mechanism mounted on said main frame and operatively connected to said draft frame for raising and lowering said blade with respect to the ground, and a power take-off shaft extending from the tractor through said power lift mechanism for operatively driving the same and for driving said elevator.

21. A tractor drawn agricultural implement comprising a main frame, of a draft frame pivoted to said main frame, movable elements mounted on said main frame, a power transmission mechanism mounted on said main frame and driven by said tractor for driving said movable elements, and a power lift mechanism associated with and driven by said transmission mechanism and operatively connected with said draft frame for adjusting said main frame with respect to said draft frame.

22. A tractor drawn agricultural implement comprising a main frame, a draft frame pivoted to said main frame, movable elements mounted on said main frame, a power transmission mechanism mounted on said main frame and driven by said tractor for driving said movable elements, power lift mechanism associated with and driven by said transmission mechanism and operatively connected to said draft frame for adjusting said main frame with respect to said draft frame, and means mounted on said draft frame for manually controlling the relative positions of said main frame with respect to said draft frame in their lowered position.

23. A tractor drawn potato digger comprising a frame, a plurality of digger blades mounted in the forward end of said frame, movable elevating means mounted on said frame, a draft frame connecting said main frame to said tractor, a power lift mechanism mounted on said main frame and operatively connected to said draft frame for raising and lowering said blades with respect to the ground, and a power take off shaft extending from said tractor through said power lift mechanism for operatively driving the same and for driving said elevating means.

24. A tractor drawn potato digger comprising a frame, a plurality of digger blades mounted in the forward end of said frame, movable elevating means mounted on said frame, a draft frame connecting said main frame to said tractor, a power lift mechanism mounted on said main frame and operatively connected to said draft frame for raising and lowering said blades with respect to the ground, and separate manually operable levers mounted on said draft frame and operatively connected to said power lift mechanism for regulating the depth penetration of said digger blades.

HERMAN E. ALTGELT.